US010997347B2

(12) United States Patent
Lo et al.

(10) Patent No.: US 10,997,347 B2
(45) Date of Patent: May 4, 2021

(54) INTEGRATED CIRCUIT DESIGN METHOD, SYSTEM AND COMPUTER PROGRAM PRODUCT

(71) Applicant: TAIWAN SEMICONDUCTOR MANUFACTURING COMPANY LTD., Hsinchu (TW)

(72) Inventors: Wan-Yu Lo, Zhongli (TW); Chung-Hsing Wang, Baoshan Township (TW); Chin-Shen Lin, Taipei (TW); Kuo-Nan Yang, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/577,457

(22) Filed: Sep. 20, 2019

(65) Prior Publication Data

US 2020/0134120 A1  Apr. 30, 2020

Related U.S. Application Data

(60) Provisional application No. 62/753,667, filed on Oct. 31, 2018.

(51) Int. Cl.
*G06F 30/398* (2020.01)
*G06F 30/392* (2020.01)
(Continued)

(52) U.S. Cl.
CPC .......... *G06F 30/392* (2020.01); *G06F 30/398* (2020.01); *G06F 2111/10* (2020.01); *G06F 2111/20* (2020.01); *G06F 2119/08* (2020.01)

(58) Field of Classification Search
CPC .. G06F 30/392; G06F 30/398; G06F 2111/10; G06F 2111/20; G06F 2119/08; G06F 2119/06; G06F 2119/12
See application file for complete search history.

(56) References Cited

U.S. PATENT DOCUMENTS 7,260,442 B2  8/2007  Hwang et al.
9,256,709 B2  2/2016  Yu et al.
(Continued)

OTHER PUBLICATIONS

Bodeker, Christian et al., "Stability of Silicon Carbide Schottky Diodes Against Leakage Current Thermal Runaway", Proceedings of the 27th International Symposium on Power Semiconductor Devices & IC's; May 10-14, 2015, Kowloon Shangri-La, Hong Kong; pp. 245-248.

*Primary Examiner* — Nghia M Doan
(74) *Attorney, Agent, or Firm* — Hauptman Ham, LLP

(57) ABSTRACT

In a method, based on an operating condition of a region of an integrated circuit (IC), a first relationship between a temperature and heating power of the region is determined. Based on a cooling capacity of the region, a second relationship between the temperature and cooling power of the region is determined. Based on the first relationship and the second relationship, it is determined whether the region is thermally stable. In response to a determination that the region is thermally unstable, at least one of a structure or the operating condition of the region is changed. At least one of the determination of the first relationship, the determination of the second relationship, the determination of thermally stability of the region, or the change of at least one of the structure or the operating condition of the region is executed by a processor.

20 Claims, 10 Drawing Sheets

(51) Int. Cl.
    *G06F 111/10*     (2020.01)
    *G06F 111/20*     (2020.01)
    *G06F 119/08*     (2020.01)

(56) References Cited

U.S. PATENT DOCUMENTS

| | | | |
|---|---|---|---|
| 9,323,870 B2* | 4/2016 | Chandra | G06F 30/23 |
| 10,019,545 B2* | 7/2018 | Jeng | G06F 30/39 |
| 10,579,757 B1* | 3/2020 | Pan | G06F 30/398 |
| 2009/0224356 A1* | 9/2009 | Chandra | G06F 30/23 |
| | | | 257/499 |
| 2014/0040838 A1 | 2/2014 | Liu et al. | |
| 2014/0200845 A1* | 7/2014 | Yoshinari | G06F 30/23 |
| | | | 702/136 |
| 2015/0278429 A1 | 10/2015 | Chang | |

* cited by examiner

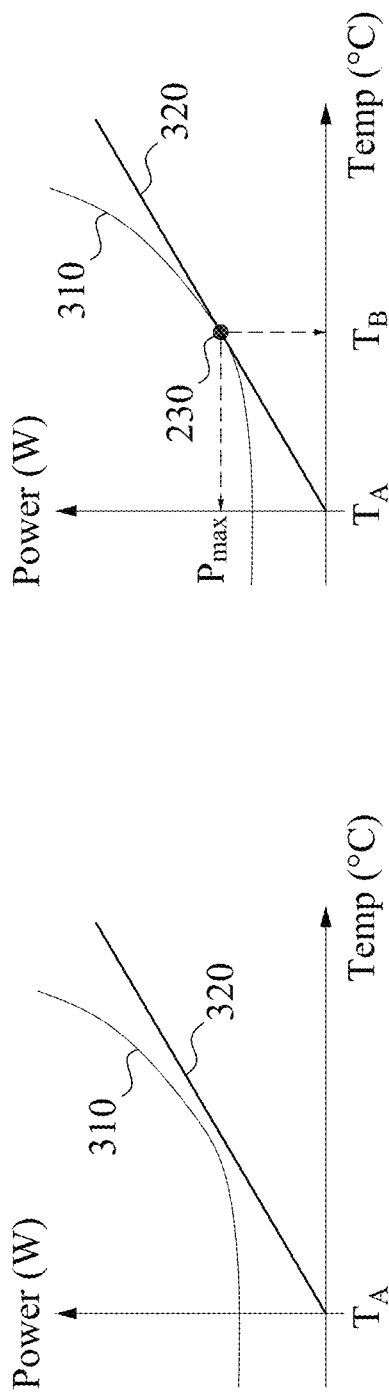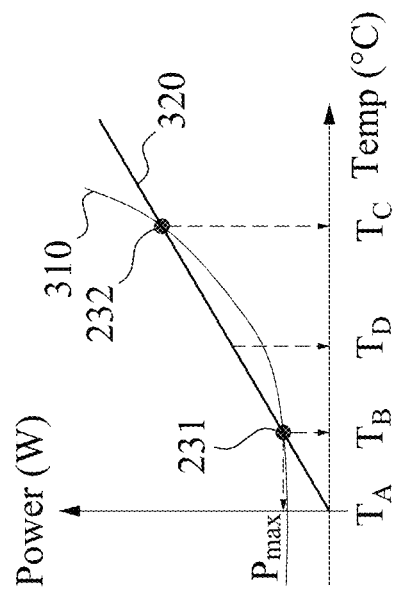
Fig. 3A
Fig. 3B
Fig. 3C

INTEGRATED CIRCUIT DESIGN METHOD, SYSTEM AND COMPUTER PROGRAM PRODUCT

PRIORITY CLAIM

The instant application claims the benefit of U.S. Provisional Application No. 62/753,667, filed Oct. 31, 2018, the entirety of which is incorporated by reference herein.

BACKGROUND

An integrated circuit (IC) typically includes a number of semiconductor devices represented in an IC layout diagram. The IC layout diagram is generated from an IC schematic, such as an electrical diagram of the IC. At various steps during the IC design process, from the IC schematic to the IC layout diagram for actual manufacture of the IC, various checking and testing are performed to make sure that the IC can be made and will function as designed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A-3C are schematic views of heating power and cooling power characteristics of a cell in various situations, in accordance with some embodiments.

DETAILED DESCRIPTION

Figure 1:
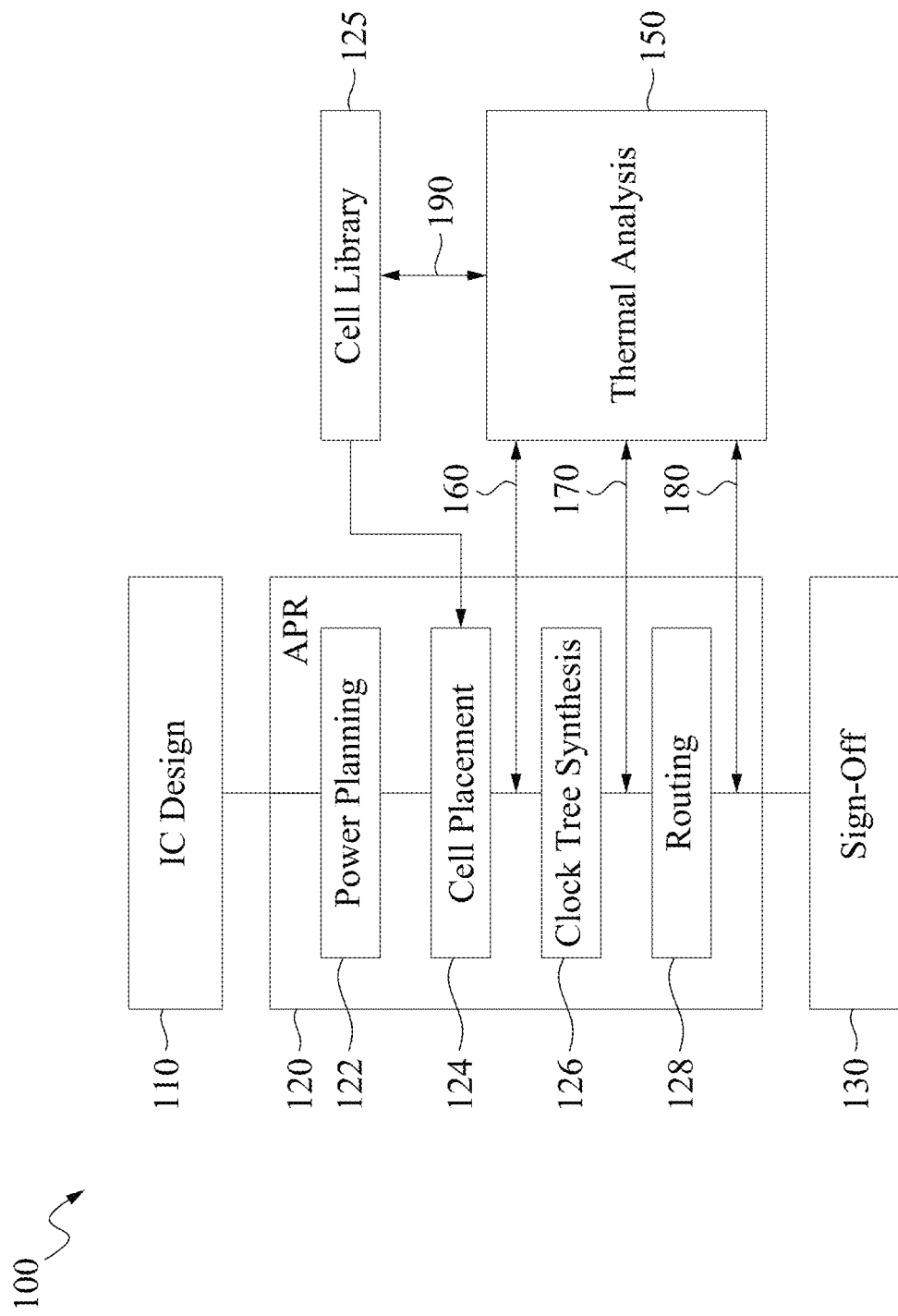
FIG. 1 is a functional flow chart of at least a portion of an IC design flow in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In an IC design process, one or more pre-manufacturing verifications are directed to heat generation and heat dissipation to regulate device reliability. When a semiconductor device having an integrated circuit experiences excessive temperatures, or thermal runaway, the device reliability potentially suffers and a risk of device failure increases. In some embodiments, heating and cooling power characteristics of a region of an IC are determined, and the region is determined to be thermally stable or unstable based on the heating and cooling power characteristics. When it is determined that the region is thermally unstable, at least one of a structure or an operating condition of the region is modified to achieve thermal stability in the region. As a result, it is possible to identify hotspots in an IC at the cell level and/or at an early stage in the IC design process. This is an improvement over other approaches where a thermal runaway analysis is performed at the system level and/or at a later stage in the IC design process.

FIG. 1 is a functional flow chart of at least a portion of an IC design flow 100 in accordance with some embodiments. The design flow 100 utilizes one or more electronic design automation (EDA) tools for generating, optimizing and/or verifying a design of an IC before manufacturing the IC. The EDA tools, in some embodiments, are one or more sets of executable instructions for execution by a processor or controller or a programmed computer to perform the indicated functionality. In at least one embodiment, the IC design flow 100 is performed by a design house of an IC manufacturing system discussed herein with respect to FIG. 10.

At IC design operation 110, a design of an IC is provided by a circuit designer. In some embodiments, the design of the IC comprises an IC schematic, i.e., an electrical diagram, of the IC. In some embodiments, the schematic is generated or provided in the form of a schematic netlist, such as a Simulation Program with Integrated Circuit Emphasis (SPICE) netlist. Other data formats for describing the design are usable in some embodiments. In some embodiments, a pre-layout simulation is performed on the design to determine whether the design meets a predetermined specification. When the design does not meet the predetermined specification, the IC is redesigned. In at least one embodiment, a pre-layout simulation is omitted.

At Automatic Placement and Routing (APR) operation 120, a layout diagram of the IC is generated based on the IC schematic. The IC layout diagram comprises the physical positions of various circuit elements of the IC as well as the physical positions of various nets interconnecting the circuit elements. For example, the IC layout diagram is generated in the form of a Graphic Design System (GDS) file. Other data formats for describing the design of the IC are within the scope of various embodiments. In the example configuration in FIG. 1, the IC layout diagram is generated by an EDA tool, such as an APR tool. The APR tool receives the design of the IC in the form of a netlist as described herein. The APR tool performs floor planning to identify circuit elements, which are to be electrically connected to each other and which are to be placed in close proximity to each other, for reducing the area of the IC and/or reducing time delays of signals travelling over the interconnections or nets connecting the electrically connected circuit elements. In some embodiments, the APR tool performs partitioning to divide the design of the IC into a plurality of blocks or groups, such as clock and logic groups. In the example configuration in FIG. 1, the APR tool performs power planning operation 122, cell placement operation 124, clock tree synthesis operation 126 and routing operation 128.

At power planning operation 122, the APR tool performs power planning, based on the partitioning and/or the floor planning of the IC design, to generate a power grid structure which includes several conductive layers, such as, metal layers. One metal layer of the metal layers includes power lines or power rails running in one direction, e.g., horizontally in a plan view. Another metal layer of the metal layers includes power lines or power rails running in an orthogonal direction, e.g., vertically in a plan view.

At cell placement operation 124, the APR tool performs cell placement. For example, standard cells (also referred to herein as "cells") configured to provide pre-defined functions and having pre-designed layout diagrams are stored in one or more cell libraries 125. The APR tool accesses various cells from one or more cell libraries 125, and places the cells in an abutting manner to generate an IC layout diagram corresponding to the IC schematic.

The generated IC layout diagram includes the power grid structure and a plurality of cells, each cell including one or more circuit elements and/or one or more nets. A circuit element is an active element or a passive element. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), FinFETs, planar MOS transistors with raised source/drains, or the like. Examples of passive elements include, but are not limited to, capacitors, inductors, fuses, and resistors. Examples of nets include, but are not limited to, vias, conductive pads, conductive traces, and conductive redistribution layers, or the like.

At clock tree synthesis (CTS) operation 126, the APR tool performs CTS to minimize skew and/or delays potentially present due to the placement of circuit elements in the IC layout diagram. The CTS includes an optimization process to ensure that signals are transmitted and/or arrived at appropriate timings. For example, during the optimization process within the CTS, one or more vias are inserted into the IC layout diagram to add and/or remove slack (timing for signal arrival) to achieve a desired timing.

At routing operation 128, the APR tool performs routing to route various nets interconnecting the placed circuit elements. The routing is performed to ensure that the routed interconnections or nets satisfy a set of constraints. For example, routing operation 128 includes global routing, track assignment and detailed routing. During the global routing, routing resources used for interconnections or nets are allocated. For example, the routing area is divided into a number of sub-areas, pins of the placed circuit elements are mapped to the sub-areas, and nets are constructed as sets of sub-areas in which interconnections are physically routable. During the track assignment, the APR tool assigns interconnections or nets to corresponding conductive layers of the IC layout diagram. During the detailed routing, the APR tool routes interconnections or nets in the assigned conductive layers and within the global routing resources. For example, detailed, physical interconnections are generated within the corresponding sets of sub-areas defined at the global routing and in the conductive layers defined at the track assignment. After routing operation 128, the APR tool outputs the IC layout diagram including the power grid structure, placed circuit elements and routed nets. The described APR tool is an example. Other arrangements are within the scope of various embodiments. For example, in one or more embodiments, one or more of the described operations are omitted.

At sign-off operation 130, one or more physical and/or timing verifications are performed. For example, sign-off operation 130 includes one or more of a resistance and capacitance (RC) extraction, a layout-versus-schematic (LVS) check, a design rule check (DRC) and a timing sign-off check (also referred to as a post-layout simulation). Other verification processes are usable in other embodiments.

An RC extraction is performed, e.g., by an EDA tool, to determine parasitic parameters, e.g., parasitic resistance and parasitic capacitance, of components in the IC layout diagram for timing simulations in a subsequent operation.

An LVS check is performed to ensure that the generated IC layout diagram corresponds to the design of the IC. Specifically, an LVS checking tool, i.e., an EDA tool, recognizes electrical components as well as connections therebetween from the patterns of the generated IC layout diagram. The LVS checking tool then generates a layout netlist representing the recognized electrical components and connections. The layout netlist generated from the IC layout diagram is compared, by the LVS checking tool, with the schematic netlist of the design of the IC. If the two netlists match within a matching tolerance, the LVS check is passed. Otherwise, correction is made to at least one of the IC layout diagram or the design of the IC by returning the process to IC design operation 110 and/or APR operation 120.

A DRC is performed, e.g., by an EDA tool, to ensure that the IC layout diagram satisfies certain manufacturing design rules, i.e., to ensure manufacturability of the IC. If one or more design rules is/are violated, correction is made to at least one of the IC layout diagram or the design of the IC by returning the process to IC design operation 110 and/or APR operation 120. Examples of design rules include, but are not limited to, a width rule which specifies a minimum width of a pattern in the IC layout diagram, a spacing rule which specifies a minimum spacing between adjacent patterns in the IC layout diagram, an area rule which specifies a minimum area of a pattern in the IC layout diagram, etc. In one or more embodiments, at least one of the design rules is voltage-dependent. A DRC that is performed to check compliance of an IC layout diagram with one or more voltage-dependent design rules is referred to as a VDRC.

A timing sign-off check (post-layout simulation) is performed, e.g., by an EDA tool, to determine, taking the extracted parasitic parameters into account, whether the IC layout diagram meets a predetermined specification of one or more timing requirements. If the simulation indicates that the IC layout diagram does not meet the predetermined specification, e.g., if the parasitic parameters cause undesirable delays, correction is made to at least one of the IC layout diagram or the design of the IC by returning the process to IC design operation 110 and/or APR operation 120. Otherwise, the IC layout diagram is passed to manufacture or additional verification processes.

An additional verification process involves a thermal analysis which becomes increasingly important as device and wire dimensions of ICs shrink which, in turn, greatly impact the heat dissipation capability of ICs. Thermal effects have a negative impact on ICs. For example, excessive temperatures tend to promote dopant diffusion and sometimes lead to high leakage current or shorts in a device, reducing the device's reliability.

In some other approaches, a thermal analysis is performed at the system level, e.g., at sign-off operation 130. If a result of the thermal analysis does not meet one or more design specifications, time-consuming modifications are potentially expected. Further, at the system level, the complexity of the IC is so high that if the thermal analysis of the IC fails to meet a design specification, it will be difficult to identify a part of the IC that was the main cause for the IC, as a whole, to fail the thermal analysis. The described disadvantages are avoidable in some embodiments described herein.

In some embodiments, a thermal analysis 150 is performed by the APR tool or by another EDA tool, and is performed at the cell or block level. For example, thermal analysis 150 is performed for a region of the IC, instead of the whole IC. In at least one embodiment, a region of the IC includes a standard cell. In at least one embodiment, a region includes a group of block of standard cells of the same or similar type or function, e.g., a block or group of NAND cells, or a block or group of inverter cells, or a block or group of clock cells etc. In at least one embodiment, a region includes a group of block of standard cells of different types or functions coupled to provide a function or module for the IC, e.g., a communication interface. Other arrangements for dividing the IC into multiple regions for a thermal analysis are within the scopes of various embodiments. For simplicity, in the detailed description of one or more embodiments herein, a standard cell or cell is used as an example of a region of an IC.

In some embodiments, thermal analysis 150 is performed at an early design stage. In at least one embodiment, thermal analysis 150 is performed between cell placement operation 124 and clock tree synthesis operation 126, as indicated at arrow 160 in FIG. 1. In at least one embodiment, thermal analysis 150 is performed between clock tree synthesis operation 126 and routing operation 128, as indicated at arrow 170 in FIG. 1. In at least one embodiment, thermal analysis 150 is performed between routing operation 128 and sign-off operation 130, as indicated at arrow 180 in FIG. 1. In at least one embodiment, thermal analysis 150 is performed multiple times in IC design flow 100, for example, at two or more stages indicated by arrows 160, 170, 180. In at least one embodiment, sign-off operation 130 still includes a thermal analysis at the system level despite that thermal analysis 150 has been performed earlier after one or more of cell placement 124, clock tree synthesis operation 126, routing operation 128. In at least one embodiment, thermal analysis 150 is performed to determine thermal stability of a standard cell in one or more cell libraries 125, as indicated at arrow 190 in FIG. 1.

As described herein, thermal analysis 150 is performed to determine thermal stability of a region, such as a cell, of an IC. Heat in a cell of an IC is generated by electrical current flowing through one or more active devices in the cell. Cooling of the cell occurs as heat dissipates away from the heat generation sources, such as the one or more active devices in the cell. A cell is thermally stable when thermal runaway is determined to not occur at a designed operating condition of the cell; otherwise, the cell is thermally unstable. Thermal runaway is a condition where heating power generated in the cell uncontrollably exceeds cooling power of the cell.

In some embodiments, for a continuously operating cell of an IC, the heating power of the cell corresponds to a sum of static power and dynamic power. The dynamic power, also referred to as active power, is power required to change or switch an output of the cell from one level to another, for example, from a low level to a high level, or vice versa. The dynamic power includes switching power and internal power. The switching power is the power required at the output of the cell during switching. The internal power is the power required inside the cell during switching. The static power, also referred to as leakage power, is power consumed by the cell regardless of a switching activity at the output of the cell. Leakage power exists both when the cell is switched, and when the cell is in a steady state, i.e., when the output of the cell remains at the same level, e.g., either the low level or the high level. Thus, the heating power of a cell is determined by the following Equation (1):

$$P_{Heating} = P_{Switching} + P_{Internal} + P_{Leakage} \quad (1)$$

where $P_{Heating}$ is the heating power, $P_{Switching}$ is the switching power, $P_{Internal}$ is the internal power, and $P_{Leakage}$ is the leakage power of the cell. The switching power and internal power depend on a cell loading, which is determined herein as described with respect to FIG. 2.

Figure 2:
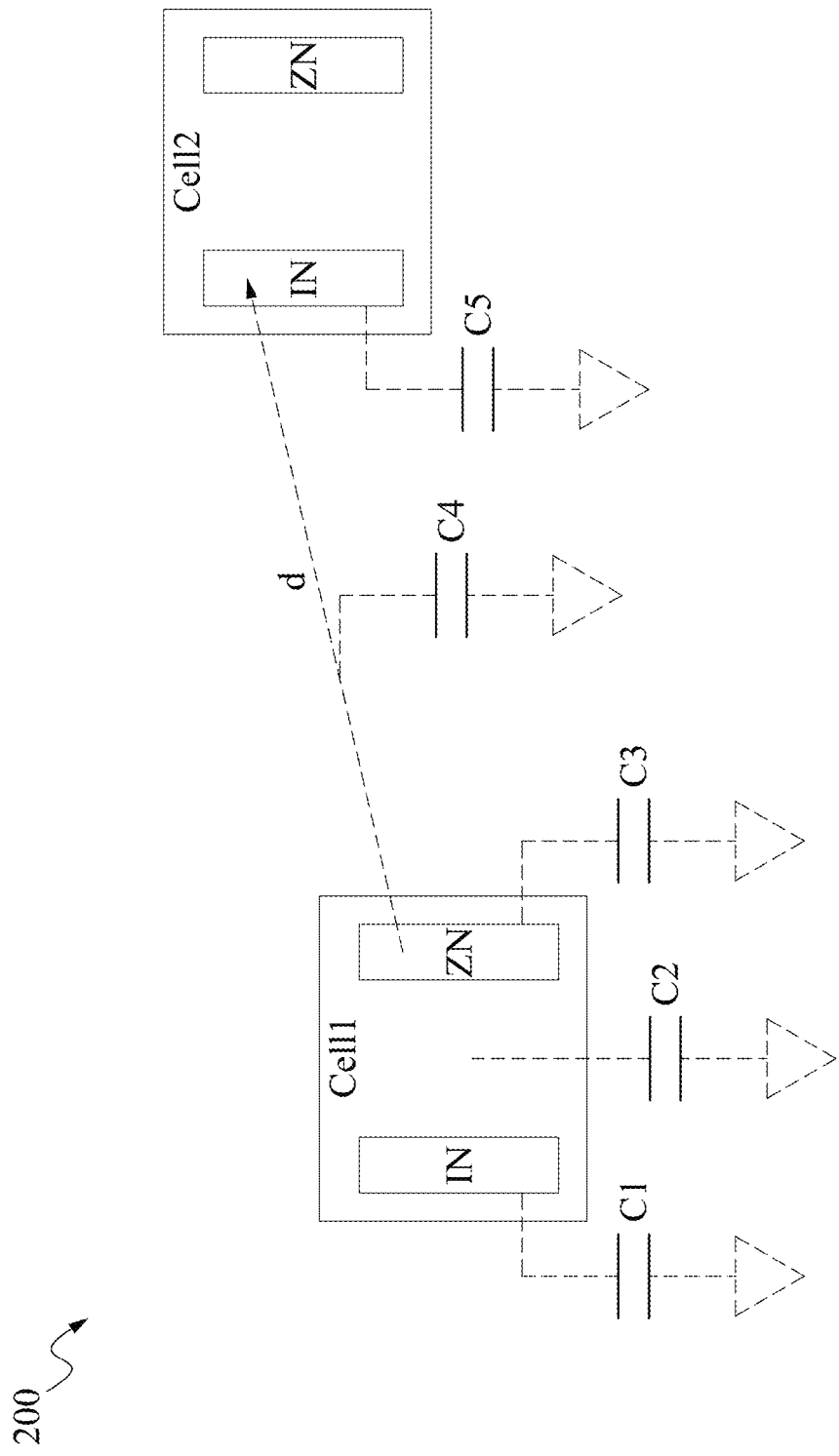
FIG. 2 is a schematic view of a plurality of cells in an IC layout diagram, in accordance with some embodiments.

FIG. 2 is a schematic view of Cell 1 and Cell 2 in an IC layout diagram 200 of an IC, in accordance with some embodiments. In at least one embodiment, IC layout diagram 200 corresponds to an IC layout diagram obtained as a result of cell placement operation 124 described with respect to FIG. 1. For simplicity, other cells in IC layout diagram 200 are omitted in FIG. 2.

Each cell in IC layout diagram 200 has at least one input net IN and at least one output net ZN. In an IC schematic corresponding to IC layout diagram 200, an input signal is inputted to input net IN of each cell, is modified or processed by internal circuity including one or more circuit elements in the cell, and is outputted as an output signal at output net ZN of the cell. Further, according to the IC schematic corresponding to IC layout diagram 200, output net ZN of Cell 1 is logically coupled to input net IN of Cell 2, to supply the output signal of Cell 1 as an input signal to Cell 2.

In each cell, input net IN is represented by an input capacitance relative to the ground, output net ZN is represented by an output capacitance relative to the ground, and the internal circuity in the cell is represented by an internal capacitance relative to the ground. For example, Cell 1 is represented by input capacitance C1, internal capacitance C2, and output capacitance C3. Cell 2 is likewise represented by input capacitance C4, internal capacitance (not shown), and output capacitance (not shown). The input capacitance, internal capacitance, and output capacitance of each cell are known or determinable from one or more cell libraries 125 from which the cell is retrieved in cell placement operation 124. For example, C1, C2, C3, and C4 are known or determinable from one or more cell libraries 125. An interconnection between output net ZN of Cell 1 and input net IN of Cell 2 is represented by connection capacitance C5 relative to the ground, and C5 is estimated based on a physical distance d between Cell 1 and Cell 2 in IC layout diagram 200. In at least one embodiment, an RC extraction is performed, e.g., by an EDA tool, based on a logical connection in the IC schematic and physical distance d in IC layout diagram 200 between Cell 1 and Cell 2, to estimate C5.

The switching power of each cell is determined by a cell loading at output net ZN of the cell. For example, the cell loading of Cell 1 is determined based on output capacitance C3 of output net ZN of Cell 1, as well as input capacitance C4 of Cell 2 and connection capacitance C5 of the interconnection coupled to output net ZN of Cell 1. In situations where output net ZN of Cell 1 has multiple connections to multiple other cells, the input capacitance of all other cells as well as the connection capacitance of all corresponding interconnections between Cell 1 and the other cells contribute to the cell loading of Cell 1. In at least one embodiment, the switching power is determined by the following Equation (2):

$$P_{Switching} = C_{loading} \times VDD^2 \times f \times \beta \quad (2)$$

where $C_{loading}$ is a capacitance corresponding to the cell loading of the cell, VDD is a designed power supply voltage to be applied to the cell, f is a designed operating frequency at which the cell is to be operated, and $\beta$ is a coefficient depending on one or more factors, e.g., a switching activity of the cell. The described method of determining switching power is an example. Other arrangements are within the scopes of various embodiments.

The internal power of a cell is caused by a short circuit current briefly flowing through the cell during switching at the output of the cell. In some situations, the internal power depends on the cell loading and/or the internal capacitance of the cell. Based on the cell loading and the internal capacitance of the cell, the internal power of the cell is determined.

In at least one embodiment, the leakage power is determined by the following Equation (3):

$$P_{Leakage} = VDD \times I_s^0 \times e^{\alpha T} \quad (3)$$

where $I_s^0$ is a leakage current from VDD through the cell to the ground, $\alpha$ is a coefficient related to a process/technology node (e.g., 6 nm, 8 nm, or 10 nm) used to manufacture the cell in an IC, and T is a current temperature of the cell. In at least one embodiment, one or more of $I_s^0$ and $\alpha$ are specified in one or more cell libraries 125 from which the cell is retrieved during cell placement operation 124. In at least one embodiment, one or more of $I_s^0$ and $\alpha$ are obtained by experiments at a semiconductor foundry. In at least one embodiment, one or more of $I_s^0$ and $\alpha$ are obtained by simulation. $I_s^0$ and/or $\alpha$ depend(s) on various manufacture-related factors, such as aspect ratio, size and/or channel doping concentration of transistors forming active elements in the cell.

Based on Equation (1) and Equation (3), the heating power of a cell is determined by the following Equation (4):

$$P_{Heating} = P_{Switching} + P_{Internal} + VDD \times I_s^0 \times e^{\alpha T} \quad (4)$$

In some embodiments, the cooling power of a cell is determined by the following Equation (5):

$$P_{Cooling} = \frac{(T - T_A)}{R_{th}} \quad (5)$$

where $P_{Cooling}$ is the cooling power of the cell, $T_A$ is an ambient temperature at which the cell is to be operated in accordance with the IC design, and $R_{th}$ is a thermal resistance of the cell. In at least one embodiment, $T_A$ is room temperature.

The thermal resistance of a cell is an indicator of cooling capacity of the cell. Cooling capacity is a measure of the ability of the cell to dissipate heat away from the heat generation sources, such as active elements in the cell, along dissipation paths into a surrounding atmosphere. In some instances, heat dissipates through various layers and/or components in a cell, including, but not limited to, dielectric materials, a substrate (e.g., an Si substrate), interconnects, contact vias, and dummy patterns of conductive materials such as metals. While interconnects and contact vias are electrically connected to various circuit elements in a cell or to other cells of the IC to provide power, clock and/or signal transmission, dummy patterns, in at least one embodiment, are not designed for such power, clock and/or signal transmission. In at least one embodiment, dummy patterns are included in one or more layers in the IC for heat dissipation. In an example, as circuit elements of an IC are provided at one side (e.g., top side) of a substrate, a dummy pattern or metal layer is provided at the other side (e.g., bottom side) of the substrate to facilitate heat dissipation to a surrounding environment. In at least one embodiment, the thermal resistance of a cell is obtained by experiments at a semiconductor foundry and/or by simulation. In at least one embodiment, the thermal resistance of a cell is specified in one or more cell libraries 125.

FIGS. 3A-3C are schematic views of a heating power characteristic 310 and a cooling power characteristic 320 of a cell in various situations, in accordance with some embodiments. Heating power characteristic 310 is a relationship between a temperature and the heating power of the cell. Cooling power characteristic 320 is a relationship between the temperature and the cooling power of the cell. Heating power characteristic 310 indicates how the heating power varies with current temperature T of the cell. In the example configuration in FIGS. 3A-3C, the heating power in heating power characteristic 310 varies exponentially with current temperature T, in accordance with the exponential component of the leakage power, as indicated in Equation (3) and Equation (4). Cooling power characteristic 320 indicates how the cooling power varies with current temperature T of the cell. In the example configuration in FIGS. 3A-3C, the cooling power in cooling power characteristic 320 varies linearly with current temperature T, in accordance with Equation (5). Cooling power characteristic 320 passes through the coordinate origin which, for simplicity, is placed at $T_A$ where the cooling power is zero per Equation (5). The described specific heating power characteristic 310 and cooling power characteristic 320 are examples. Other heating power and/or cooling power characteristics corresponding to other method for estimating and/or determining heating power and/or cooling power are within the scopes of various embodiments.

In the example situation in FIG. 3A, thermal runaway is observed and the cell is thermally unstable. As can be seen in FIG. 3A, heating power characteristic 310 and cooling power characteristic 320 have no common point. Specifically, heating power characteristic 310 is higher than cooling power characteristic 320 at any temperature, which means the heating power of the cell is greater than the cooling power of the cell at any temperature. In operation of the cell, as the temperature of the cell increases from $T_A$, cooling capacity of the cell is insufficient to dissipate the heat generated by the heating power of the cell, and the temperature of the cell is driven uncontrollably upward. The uncontrollably rising temperature causes the cell, and potentially other elements of the IC surrounding the cell, to eventually fail, which, in turn, negatively affects the IC's reliability.

In the example situation in FIG. 3B, the cell is determined to be thermally stable in at least one embodiment. As can be seen in FIG. 3B, heating power characteristic 310 and cooling power characteristic 320 have one common point at temperature $T_B$ where the heating power is equal to the cooling power. Temperature $T_B$, also referred to as stable point temperature, satisfies the following Equation (6) derived from the condition $P_{Heating}$ equal to $P_{Cooling}$ at $T_B$, as well as Equation (4) and Equation (5):

$$P_{Switching} + P_{Internal} + VDD \times I_{s0} \times e_B^{\alpha T} = \frac{(T_B - T_A)}{R_{th}} \qquad (6)$$

In operation of the cell, as the temperature of the cell increases from $T_A$, cooling capacity of the cell is sufficient to reduce the temperature difference between the cell and the surrounding environment, until the temperature of the cell reaches $T_B$ at which all heat generated by the heating power is dissipated by the cooling power. Theoretically, the temperature of the cell cannot further increase from $T_B$, because all heat generated by the heating power is dissipated at $T_B$, i.e., there is no heat left to further increase the temperature of the cell. There is, however, a concern that some variations in the operation of the cell, or other elements of the IC, potentially introduce further heat to the cell and cause the temperature of the cell to further increase beyond $T_B$. In this situation, the cooling power will be insufficient to dissipate the heat generated by the heating power beyond $T_B$, causing thermal runaway to eventually occur.

Nevertheless, in practice, an IC is often used with an external cooling device which is a passive cooling device, such as a heatsink, or an active cooling device, such as a fan, or liquid cooling equipment. The external cooling device reduces the environmental temperature $T_A$, effectively moving cooling power characteristic 320 to the left in FIG. 3B in a manner similar to FIG. 4C described herein. As a result, a more thermally stable operation will be achieved as described with respect to FIG. 3C. Thus, in some embodiments, although a thermal analysis at the design phase indicates that a theoretically stable point temperature $T_B$ exists (with some concerns that thermal runaway might occur) for a cell, such a cell is considered thermally stable with the use of an external cooling device. In at least one embodiment, when it is determined that heating power characteristic 310 and cooling power characteristic 320 have one common point, an indication is output by the EDA tool performing the thermal analysis 150, e.g., via an I/O interface described herein, to prompt the designer or end user to use the IC with an external cooling device. In at least one embodiment, the EDA tool performing the thermal analysis 150 further outputs, e.g., via an I/O interface, power value $P_{max}$ corresponding to $T_B$ as a maximum allowable power value of the cell, i.e., the cell is not to be operated at a heating power higher than $P_{max}$.

In the example situation in FIG. 3C, the cell is determined to be thermally stable, both theoretically and practically. As can be seen in FIG. 3C, heating power characteristic 310 and cooling power characteristic 320 have more than one common points at a lower temperature $T_B$ and a higher temperature $T_C$ corresponding to multiple solutions of Equation (6). $T_B$ is determined to be a stable point temperature, whereas $T_C$ is determined to be unstable. In operation of the cell, as the temperature of the cell increases from $T_A$, cooling capacity of the cell is sufficient to reduce the temperature difference between the cell and the surrounding environment, until the temperature of the cell reaches $T_B$ at which all heat generated by the heating power is dissipated by the cooling power. Theoretically, the temperature of the cell cannot further increase from $T_B$, as discussed herein. Even if the temperature of the cell further increases beyond $T_B$, e.g., to a temperature TD between $T_B$ and $T_C$, the cooling power between $T_B$ and $T_D$ is higher than the corresponding heating power, and reduces the temperature of the cell back to $T_B$, even without an external cooling device. Therefore, $T_B$ is considered thermally stable, both theoretically and practically, for the cell. On the other hand, $T_C$ is considered unstable due to the risk of thermal runaway at temperatures beyond $T_C$. In at least one embodiment, the EDA tool performing the thermal analysis 150 outputs, e.g., via an I/O interface, power value $P_{max}$ corresponding to $T_B$ as a maximum allowable power value of the cell, i.e., the cell is not to be operated at a heating power higher than $P_{max}$.

In situations described with respect to FIGS. 3B and 3C, especially the situation described with respect to FIG. 3C, thermal runaway is avoidable and the cell is thermally stable. The cell in particular and the IC in general will operate at greater efficiency and with more reliability over the lifetime of the IC, at or around stable point temperature $T_B$ where the cooling power meets or exceeds the heating power.

In situations described with respect to FIG. 3A, thermal runaway is likely and the cell is thermally unstable. Modifications to at least one of the structure or the operating condition of the cell are performed in some embodiments as described herein.

Figure 4A:
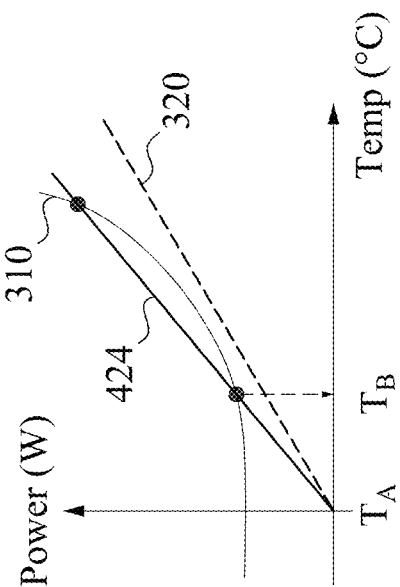
FIGS. 4A-4C are schematic views of heating and cooling power characteristics of a cell before and after modifications, in accordance with some embodiments.
Figure 4B:
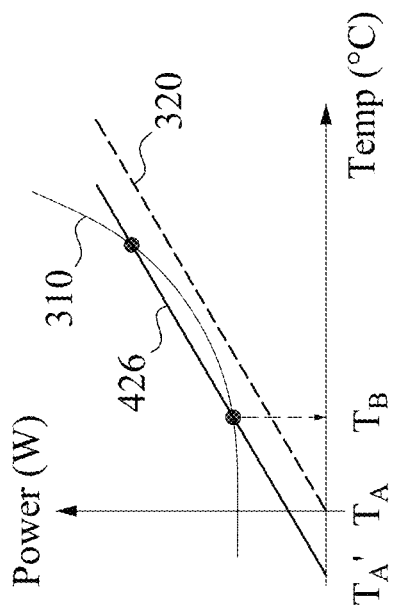
Figure 4C:
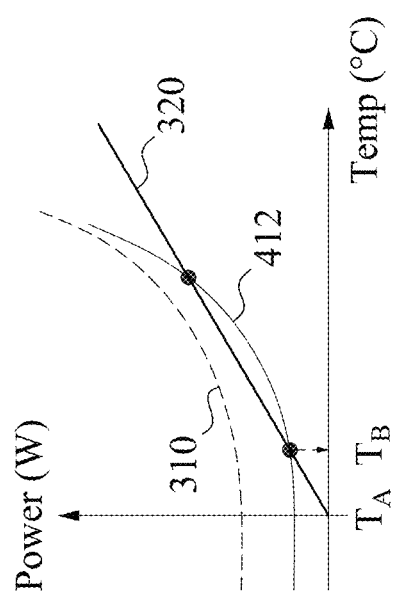

FIGS. 4A-4C are schematic views of heating and cooling power characteristics of a cell before and after modifications, in accordance with some embodiments. The modifications are made to avoid potential thermal runaway in the situation described with respect to FIG. 3A.

In the example configuration in FIG. 4A, initial heating power characteristic 310 is modified, i.e., lowered, to be a modified heating power characteristic 412 which has at least one common point with cooling power characteristic 320. A situation with two common points is illustrated in FIG. 4A. Thus, after the modification, thermal stability is achieved and a stable point temperature $T_B$ is obtained, in a manner similar to FIG. 3C.

An example to lower the heating power characteristic is to replace the cell under the power analysis with another cell having a same function but with lower heating power.

Figure 5B:
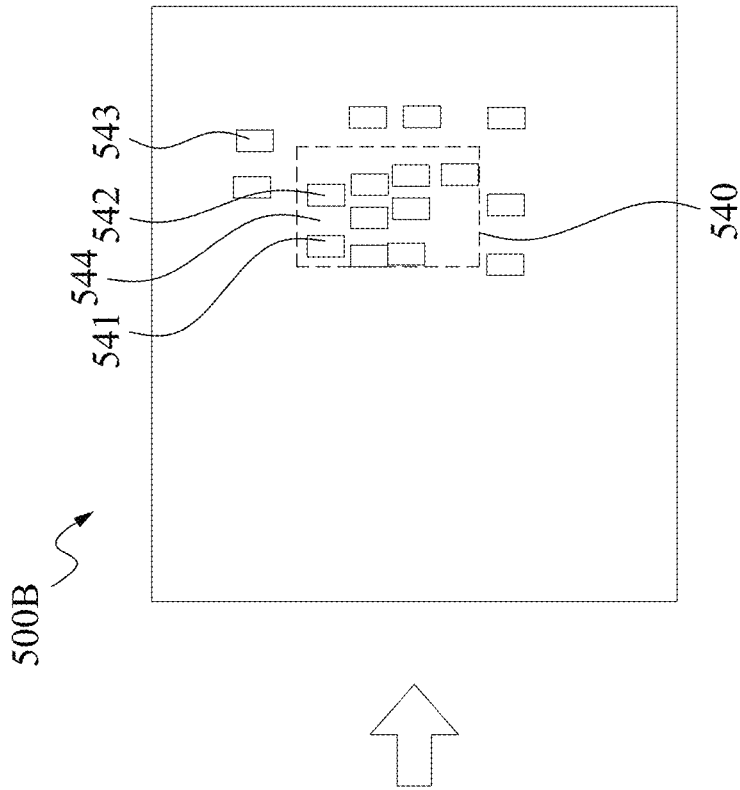
FIG. 5B is a schematic view of modified cell placement in a modified IC layout diagram, in accordance with some embodiments.
Figure 5A:
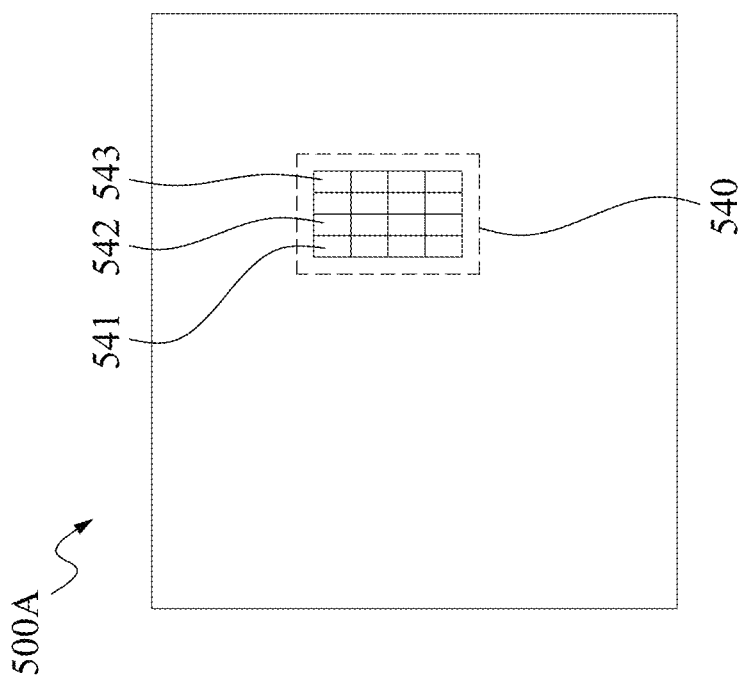
FIG. 5A is a schematic view of cell placement in an IC layout diagram.

In a region including multiple cells, an example to lower the heating power characteristic of the region is to alter the cell placement of the region to move one or more cells with high heating power out of the region, as described with respect to FIGS. 5A-5B.

A further example to lower the heating power characteristic is to lower the operating condition at which the cell is designed to operate. Examples of operating condition include, but are not limited to, power supply voltage VDD, operating frequency f, and cell loading. As can be seen from Equation (2), reducing any one or more of power supply voltage VDD, operating frequency f, or cell loading $C_{loading}$ reduces switching power $P_{Switching}$ which, in turn, reduces the heating power. In some embodiments, reducing at least one of power supply voltage VDD or operating frequency f includes changing the power specification of the cell and/or a region containing the cell and/or the IC as a whole. In some embodiments, reducing cell loading includes shortening interconnections between the cell's output ZN and other cells' inputs as described with respect to FIG. 2.

In the example configuration in FIG. 4B, initial cooling power characteristic 320 is modified to be a modified cooling power characteristic 424 which has at least one common point with heating power characteristic 310. A situation with two common points is illustrated in FIG. 4B. Thus, after the modification, thermal stability is achieved and a stable point temperature $T_B$ is obtained, in a manner similar to FIG. 3C. An example to modify the cooling power characteristic is to reduce the thermal resistance of the cell or region which, in turn, increases the cooling power from cooling power characteristic 320 to modified cooling power characteristic 424. In at least one embodiment, reducing the thermal resistance includes adding one or more dummy patterns to the cell or region, as described with respect to FIGS. 6A-6B.

In the example configuration in FIG. 4C, initial cooling power characteristic 320 is modified to be a modified cooling power characteristic 426 which has at least one common point with heating power characteristic 310. A situation with two common points is illustrated in FIG. 4C. Thus, after the modification, thermal stability is achieved and a stable point temperature $T_B$ is obtained, in a manner similar to FIG. 3C. An example to modify the cooling power characteristic is to use an external cooling device with the IC. The external cooling device reduces the environmental temperature $T_A$, effectively moving cooling power characteristic 320 to the left in FIG. 4C to obtain modified cooling power characteristic 426. This is similar to the usage of an external cooling device with the IC in the situation described with respect to FIG. 3B.

FIG. 5A is a schematic view of cell placement in an IC layout diagram 500A, and FIG. 5B is a schematic view of modified cell placement in a modified IC layout diagram 500B, in accordance with some embodiments. IC layout diagram 500A includes region 540 in which a plurality of cells 541, 542, 543 are arranged. Region 540 is subjected to thermal analysis 150 which determines that region 540 is thermally unstable. A modification is made to IC layout diagram 500A to lower the heating power of region 540 to achieve thermal stability as in an example described with respect to FIG. 4A. The modification includes altering the cell placement of region 540 to move one or more cells with high heating power out of region 540. For example, cell 543 and other cells (not numbered) are moved out of region 540. As a result, modified IC layout diagram 500B with lower heating power in region 540 is obtained as shown in FIG. 5B. Further, in in FIG. 5B, a space between cells of region 540 is increased to remove or reduce hotspots, and facilitate heat dissipation. For example, a space 544 is created between adjacent cells 541, 542, while keeping cells 541, 542 in region 540.

In at least one embodiment, the alteration of cell placement is performed locally for region 540. Therefore, processing time is reduced compared to when cell placement is to be re-performed for the whole IC layout diagram 500A, or a substantial thereof. An approach for altering cell placement is to use a different place and route algorithm which results in previously crowded cells to be scattered around in a wider area. Another approach for altering cell placement is to use the same place and route algorithm as in cell placement 124, but with a different timing requirement and/or cell placement priority, with a similar result of scattering previously crowded cells around in a wider area. Other approaches for altering cell placement are within the scopes of various embodiments.

Figure 6B:
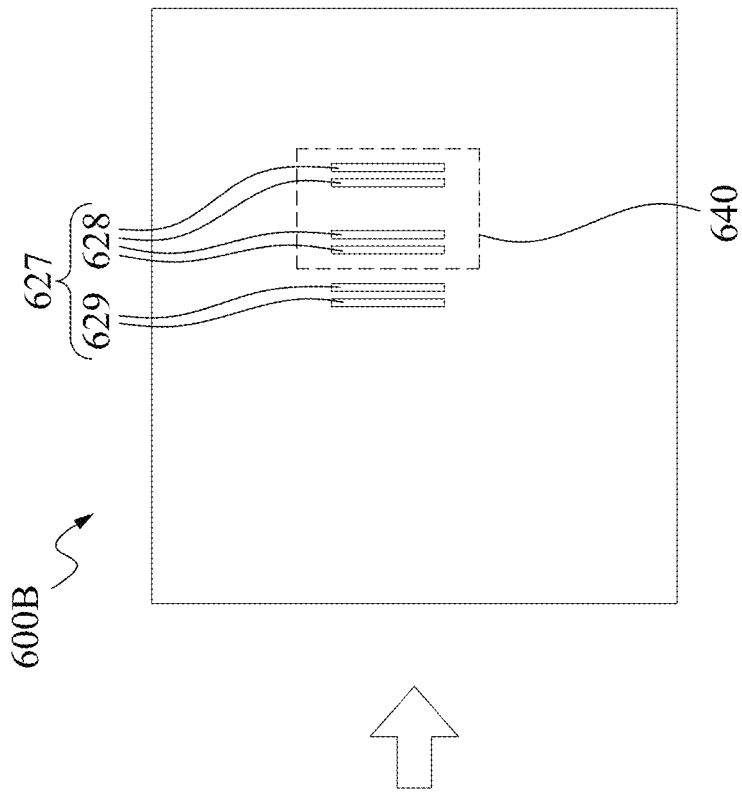
FIG. 6B is a schematic view of a modified IC layout diagram, in accordance with some embodiments.
Figure 6A:
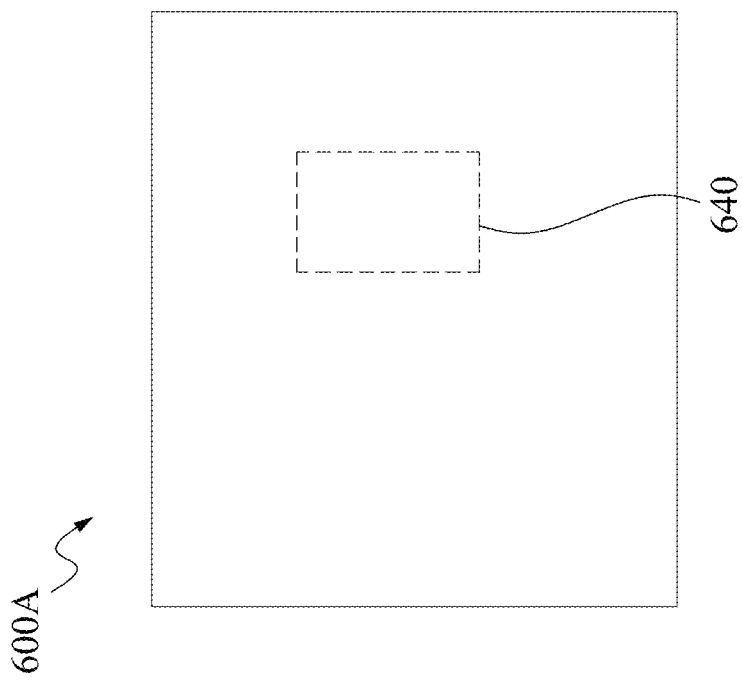
FIG. 6A is a schematic view of an IC layout diagram.

FIG. 6A is a schematic view of an IC layout diagram 600A, and FIG. 6B is a schematic view of a modified IC layout diagram 600B, in accordance with some embodiments. IC layout diagram 600A includes region 640. Region 640 is subjected to thermal analysis 150 which determines that region 640 is thermally unstable. A modification is made to IC layout diagram 600A to reduce the thermal resistance of region 640 to achieve thermal stability as in an example described with respect to FIG. 4B. The modification includes adding one or more dummy patterns 627 to or around region 640. For example, one or more dummy patterns 628 are added to region 640 and/or one or more dummy patterns 629 are added around region 640. As a result, modified IC layout diagram 600B with lower thermal resistance and corresponding higher cooling power in region 640 is obtained as shown in FIG. 6B.

In at least one embodiment, the addition of dummy patterns is performed locally for, or in a vicinity of, region 640 which is a hotspot with a risk of thermal runaway according to a thermal analysis performed for region 640. Therefore, processing time is reduced compared to when the whole IC layout diagram 600A, or a substantial thereof, is to be modified. In at least one embodiment, one or more dummy patterns are added as part of a routing operation.

Figure 7:
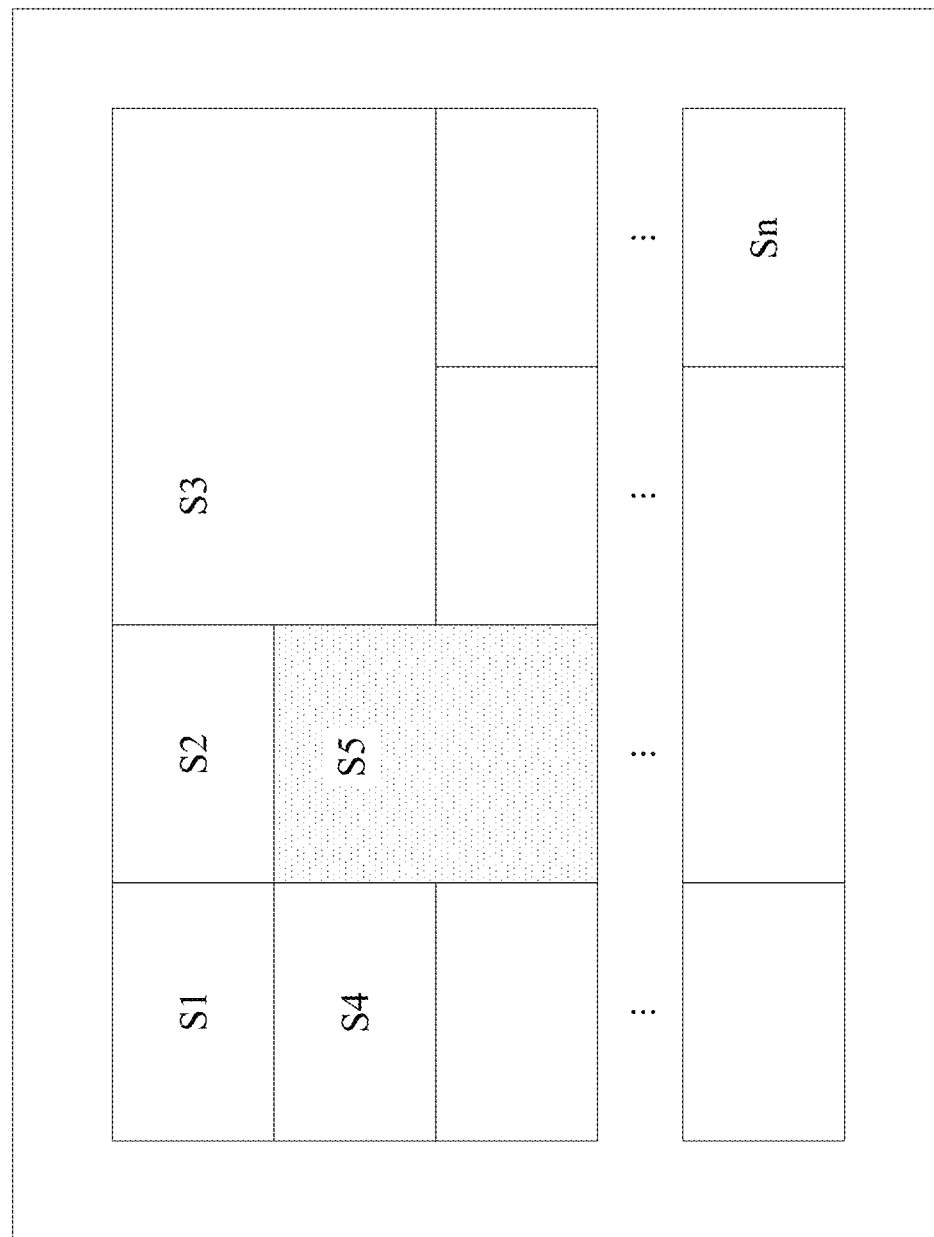
FIG. 7 is a schematic view of an IC layout diagram having a plurality of regions, in accordance with some embodiments.

FIG. 7 is a schematic view of an IC layout diagram 700 having a plurality of regions, in accordance with some embodiments. In the example configuration in FIG. 7, IC layout diagram 700 includes a plurality of regions S1, S2, . . . Sn with various sizes, e.g., as shown at regions S1, S3, and S5. The regions are individually tested in a power analysis, as opposed to the whole system test in other approaches. Regions found thermally unstable, e.g., region S5 in FIG. 7, are identified as potential hotspots in operation of the IC, and modifications are made individually in the hotspot regions, as opposed to the whole system in other approaches. As a result, a more accurate power analysis is achievable and processing time is reduced, compared to other approaches.

In at least one embodiment, when all regions subject to a thermal analysis are found or modified to be thermally stable, the maximum allowable power value $P_{max}$ corresponding to no risk of thermal runaway is determined for each region. A sum of the maximum allowable power values $P_{max}$ of all regions is obtained and outputted by the EDA tool, e.g., via an I/O interface, as a total target power value at the chip (or system) level for the IC. This total target power value, in one or more embodiments, helps the IC designer to fine tune the power specification of the IC at the chip level.

Figure 8:
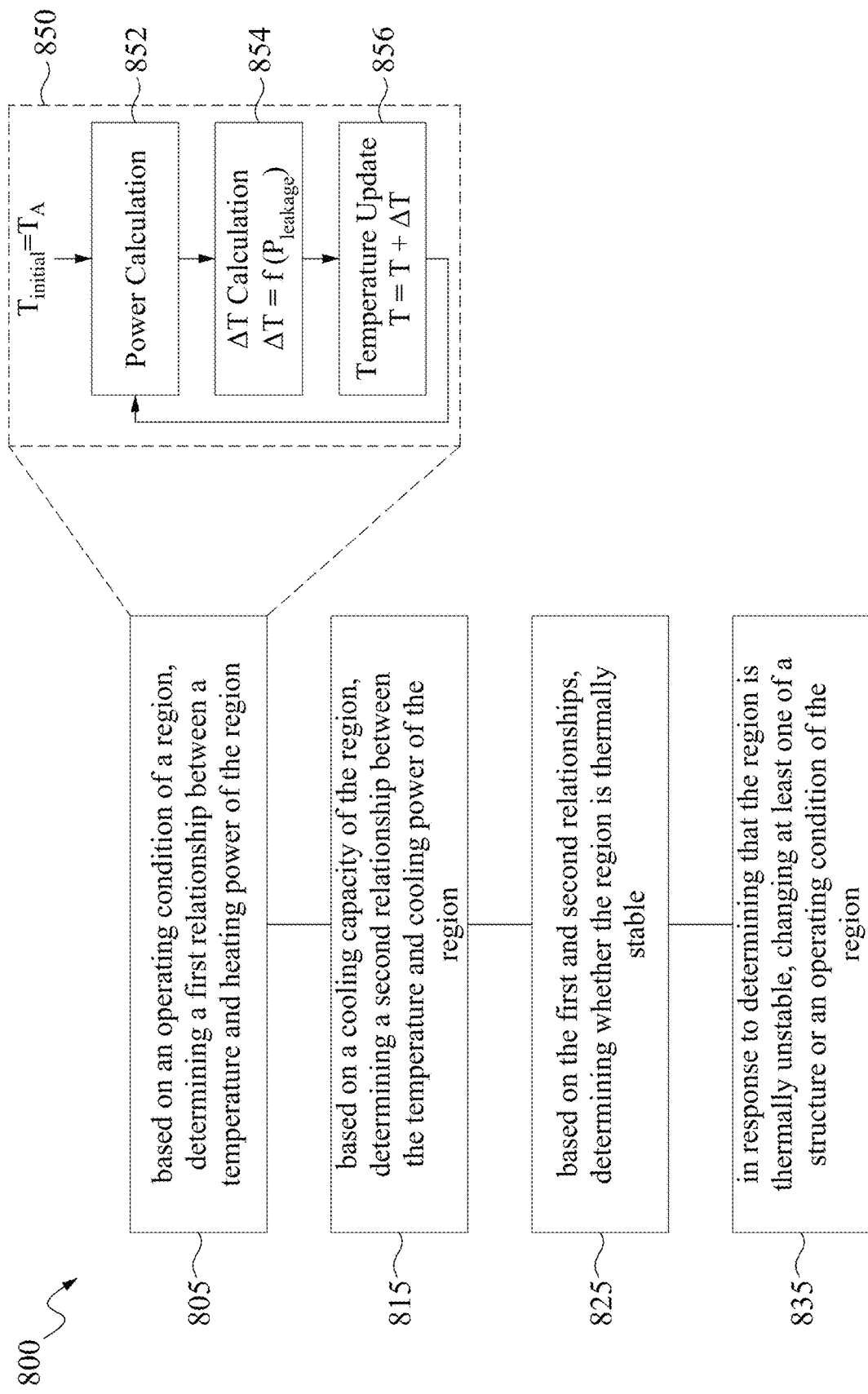
FIG. 8 is a flow chart of a method, in accordance with some embodiments.

FIG. 8 is a flow chart of a method 800, in accordance with some embodiments. In at least one embodiment, method 800 corresponds to thermal analysis 150, and is performed in whole or in part by a processor as described herein.

At operation 805, based on an operating condition of a region of an IC, a first relationship between a temperature and heating power of the region is determined. For example, a heating power characteristic 310 as a first relationship between a temperature and heating power of a cell is determined, as illustrated in example situations described with respect to FIGS. 3A-3C. In some embodiments, the heating power at a temperature T is determined as total power $P_{Total}$ supplied to the cell at temperature T, by the following Equation (7):

$$P_{Heating} = P_{Total} = VDD \times I(T) \quad (7)$$

where I(T) is the current supplied to the cell at temperature T during operation of the cell. In at least one embodiment, I(T) is obtained at several temperature values by experiments at a foundry, or by simulation. For example, I(T) is obtainable by a SPICE simulation using a model embedding therein a function between the temperature and current of the cell.

At operation 815, based on a cooling capacity of the region, a second relationship between the temperature and cooling power of the region is determined. For example, a cooling power characteristic 320 as a second relationship between the temperature and cooling power of the cell is determined, as illustrated in example situations described with respect to FIGS. 3A-3C. In some embodiments, the cooling power is determined based on Equation (5).

At operation 825, based on the first and second relationships, it is determined whether the region is thermally stable. For example, heating power characteristic 310 and cooling power characteristic 320 are considered to determine whether heating power characteristic 310 and cooling power characteristic 320 have a common point or not. A common point $T_B$ if exists is a solution of Equation (6). When heating power characteristic 310 and cooling power characteristic 320 have at least one common point, as illustrated in example situations described with respect to FIGS. 3B-3C, the cell is determined to be thermally stable. When heating power characteristic 310 and cooling power characteristic 320 have no common point, as illustrated in an example situation described with respect to FIG. 3A, the cell is determined to be thermally unstable.

At operation 835, in response to determining that the region is thermally unstable, at least one of a structure or an operating condition of the region is changed. Examples of changing the structure of a region or a cell include, but are not limited to, altering placement of at least one cell as described with respect to FIGS. 4A, 5A, 5B, adding dummy patterns in or around the region or cell as described with respect to FIGS. 4B, 6A, 6B, replacing at least one cell with another cell having a same function but with lower heating power as described with respect to FIG. 4A. Examples of changing the operating condition of a region or a cell include, but are not limited to, changing power supply voltage VDD or operating frequency f as described with respect to FIG. 4A.

In at least one embodiment, the relationship between the temperature and heating power of a region at operation 805 is determined by a process 850 of repeatedly performing a plurality of iterations, each of which includes operations 852, 854, 856. A situation where process 850 is useful is when it is not practical or feasible to obtain $P_{Heating}$ from VDD and I(T) by Equation (7). For example, when the region to undergo a thermal analysis is a full chip or a portion or block of chip with a large number of circuit elements, e.g., thousands or even millions of transistors, it is not practical or feasible to obtain current I(T) from simulation. In such a situation, $P_{Heating}$ is determined at various temperatures by process 850 and Equation (1), i.e.:

$$P_{Heating} = P_{Switching} + P_{Internal} + P_{Leakage} \quad (1)$$

Specifically, at operation 852, various power values are calculated. In at least one embodiment, $P_{Switching}$ is determined based on Equation (2) and cell loading as described with respect to FIG. 2, $P_{Internal}$ is determined based on the cell loading, internal capacitance and short-circuit current as described herein, and $P_{Leakage}$ is determined at temperature T of the region, using Equation (3). The sum of $P_{Switching}$, $P_{Internal}$ and $P_{Leakage}$ in accordance with Equation (1) provides a value of $P_{Heating}$ at temperature T of the region.

At operation 854, a temperature increment ΔT corresponding to the calculated leakage power is determined by the following Equation (8):

$$\Delta T = \ln \frac{VDD \times I_{s0}}{P_{Leakage}} \quad (8)$$

At operation 856, temperature T is updated, e.g., incremented, by ΔT. The updated temperature is used in the next iteration as the process flow returns to operation 852. As a result, a further value of $P_{Heating}$ is obtained for the updated temperature, and is recorded in association with the updated temperature in the table.

After several iterations, a plurality of pairs of values of T and $P_{Heating}$ is obtained and recorded in the table, and is used to generate the relationship between T and $P_{Heating}$ of the region for subsequent operations in the thermal analysis of method 800.

In at least one embodiment, all operations of method 800 are automatically performed without user input or intervention.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, standard cells for forming an IC are evaluated in a thermal analysis during the design phase in order to ensure that a later formed IC does not experience thermal runaway. Such a thermal analysis permits the EDA tool to identify hotspots in the IC at the cell level and/or at an early stage in the IC design process. This is an improvement over other approaches where thermal performance is evaluated at the system level and/or at a later stage in the IC design process. In some embodiments, maximum allowable power values of various standard cells for avoiding thermal runaway are identified, and are used to identify a target total power of the IC which, in turn, is usable in fine tune the power specification at the chip or system level.

In some embodiments, at least one method(s) discussed above is performed in whole or in part by at least one EDA system. In some embodiments, an EAD system is usable as part of a design house of an IC manufacturing system discussed below.

Figure 9:
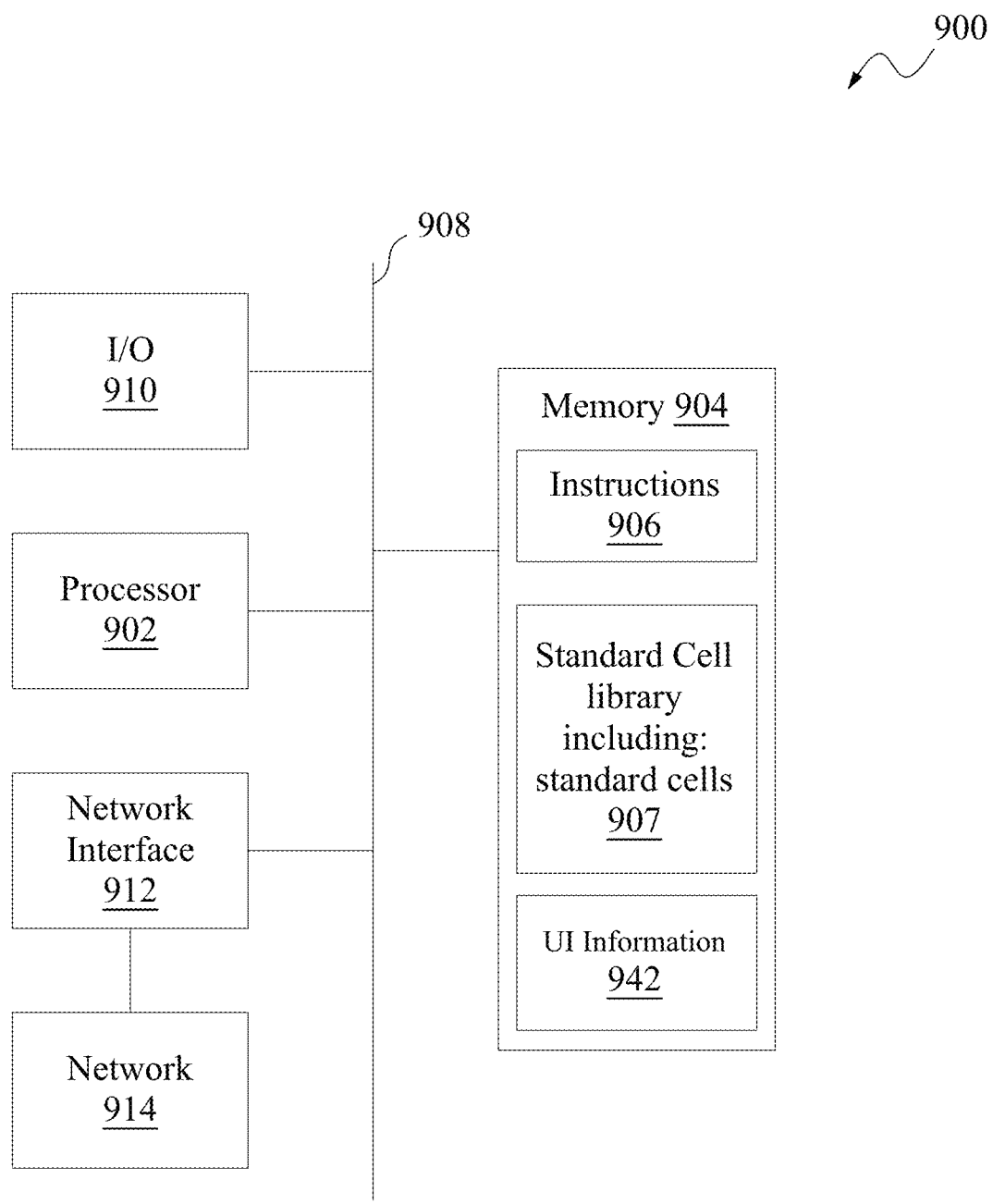
FIG. 9 is a block diagram of an EDA system, in accordance with some embodiments.

FIG. 9 is a block diagram of EDA system 900 in accordance with some embodiments. In some embodiments, EDA system 900 includes an automated placement and routing (APR) system.

In some embodiments, EDA system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part)

an EDA tool which implements a portion or all of the methods described herein in accordance with one or more embodiments (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause EDA system 900 to perform a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause EDA system 900 (where such execution represents (at least in part) the EDA tool) to perform a portion or all of the noted processes and/or methods. In one or more embodiments, storage medium 904 also stores information which facilitates performing a portion or all of the noted processes and/or methods. In one or more embodiments, storage medium 904 stores a library 907 of standard cells.

EDA system 900 includes I/O interface 910. In one or more embodiments, I/O interface 910 includes an input device, an output device and/or a combined input/output device for enabling a user and/or external circuitry/equipment to interact with EDA system 900. An input device comprises, for example, a keyboard, keypad, mouse, trackball, trackpad, touchscreen, and/or cursor direction keys for communicating information and commands to processor 902. An output device comprises, for example, a display, a printer, a voice synthesizer, etc. for communicating information to a user.

EDA system 900 also includes network interface 912 coupled to processor 902. Network interface 912 allows EDA system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more EDA systems 900.

EDA system 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. EDA system 900 is configured to output to and/or receive information from a user through a user interface (UI). The UI comprises I/O interface 910 and information related to UI stored in computer-readable medium 904 as UI information 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 900. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 10:
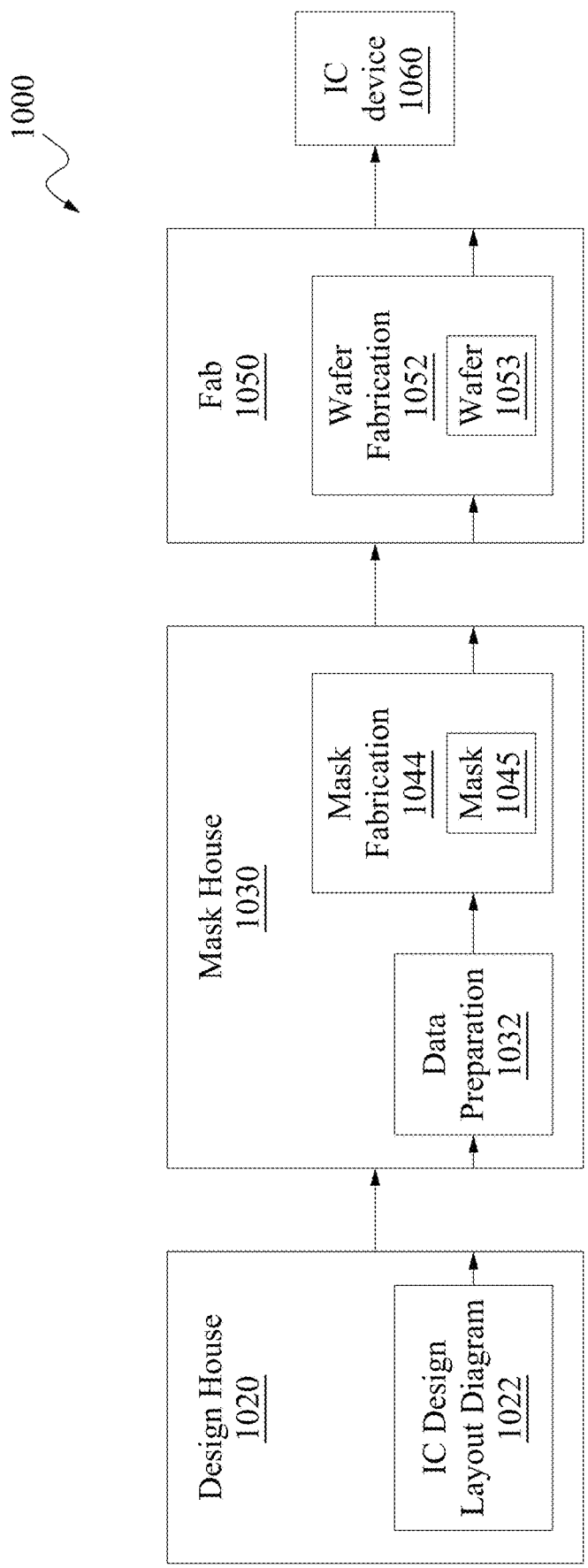
FIG. 10 is a block diagram of an IC manufacturing system and an IC manufacturing flow associated therewith, in accordance with some embodiments.

FIG. 10 is a block diagram of an integrated circuit (IC) manufacturing system 1000, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1000.

In FIG. 10, IC manufacturing system 1000 includes entities, such as a design house 1020, a mask house 1030, and an IC manufacturer/fabricator ("fab") 1050, that interact with one another in the design, development, and manufacturing cycles and/or services related to manufacturing an IC device 1060. The entities in system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1020, mask house 1030, and IC fab 1050 is owned by a single larger company. In some embodiments, two or more of design house 1020, mask house 1030, and IC fab 1050 coexist in a common facility and use common resources.

Design house (or design team) 1020 generates an IC design layout diagram 1022. IC design layout diagram 1022 includes various geometrical patterns designed for IC device 1060. The geometrical patterns correspond to patterns of metal, oxide, or semiconductor layers that make up the various components of IC device 1060 to be fabricated. The various layers combine to form various IC features. For example, a portion of IC design layout diagram 1022 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1020 implements a proper design procedure to form IC design layout diagram 1022. The design procedure includes one or more of logic design, physical design or place and route. IC design layout diagram 1022 is presented in one or more data files having information of the geometrical patterns. For example, IC design layout diagram 1022 is expressed in a GDSII file format or DFII file format.

Mask house 1030 includes data preparation 1032 and mask fabrication 1044. Mask house 1030 uses IC design layout diagram 1022 to manufacture one or more masks 1045 to be used for fabricating the various layers of IC device 1060 according to IC design layout diagram 1022. Mask house 1030 performs mask data preparation 1032, where IC design layout diagram 1022 is translated into a representative data file ("RDF"). Mask data preparation 1032 provides the RDF to mask fabrication 1044. Mask fabrication 1044 includes a mask writer. A mask writer converts the RDF to an image on a substrate, such as a mask (reticle) 1045 or a semiconductor wafer 1053. The design layout diagram 1022 is manipulated by mask data preparation 1032 to comply with particular characteristics of the mask writer and/or requirements of IC fab 1050. In FIG. 10, mask data preparation 1032 and mask fabrication 1044 are illustrated as separate elements. In some embodiments, mask data preparation 1032 and mask fabrication 1044 can be collectively referred to as mask data preparation.

In some embodiments, mask data preparation 1032 includes optical proximity correction (OPC) which uses lithography enhancement techniques to compensate for image errors, such as those that can arise from diffraction, interference, other process effects and the like. OPC adjusts IC design layout diagram 1022. In some embodiments, mask data preparation 1032 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1032 includes a mask rule checker (MRC) that checks the IC design layout diagram 1022 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1022 to compensate for limitations during mask fabrication 1044, which may undo part of the modifications performed by OPC in order to meet mask creation rules.

In some embodiments, mask data preparation 1032 includes lithography process checking (LPC) that simulates processing that will be implemented by IC fab 1050 to fabricate IC device 1060. LPC simulates this processing based on IC design layout diagram 1022 to create a simulated manufactured device, such as IC device 1060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1022.

It should be understood that the above description of mask data preparation 1032 has been simplified for the purposes of clarity. In some embodiments, data preparation 1032 includes additional features such as a logic operation (LOP) to modify the IC design layout diagram 1022 according to manufacturing rules. Additionally, the processes applied to IC design layout diagram 1022 during data preparation 1032 may be executed in a variety of different orders.

After mask data preparation 1032 and during mask fabrication 1044, a mask 1045 or a group of masks 1045 are fabricated based on the modified IC design layout diagram 1022. In some embodiments, mask fabrication 1044 includes performing one or more lithographic exposures based on IC design layout diagram 1022. In some embodiments, an electron-beam (e-beam) or a mechanism of multiple e-beams is used to form a pattern on a mask (photomask or reticle) 1045 based on the modified IC design layout diagram 1022. Mask 1045 can be formed in various technologies. In some embodiments, mask 1045 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1045 includes a transparent substrate (e.g., fused quartz) and an opaque material (e.g., chromium) coated in the opaque regions of the binary mask. In another example, mask 1045 is formed using a phase shift technology. In a phase shift mask (PSM) version of mask 1045, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1044 is used in a variety of processes. For example, such a mask(s) is used in an ion implantation process to form various doped regions in semiconductor wafer 1053, in an etching process to form various etching regions in semiconductor wafer 1053, and/or in other suitable processes.

IC fab 1050 includes wafer fabrication 1052. IC fab 1050 is an IC fabrication business that includes one or more manufacturing facilities for the fabrication of a variety of different IC products. In some embodiments, IC Fab 1050 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1050 uses mask(s) 1045 fabricated by mask house 1030 to fabricate IC device 1060. Thus, IC fab 1050 at least indirectly uses IC design layout diagram 1022 to fabricate IC device 1060. In some embodiments, semiconductor wafer 1053 is fabricated by IC fab 1050 using mask(s) 1045 to form IC device 1060. In some embodiments, the IC fabrication includes performing one or more lithographic exposures based at least indirectly on IC design layout diagram 1022. Semiconductor wafer 1053 includes a silicon substrate or other proper substrate having material layers formed thereon. Semiconductor wafer 1053 further includes one or more of various doped regions, dielectric features, multi-level interconnects, and the like (formed at subsequent manufacturing steps).

Details regarding an integrated circuit (IC) manufacturing system (e.g., system 1000 of FIG. 10), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In a method in accordance with some embodiments, based on an operating condition of a region of an integrated circuit (IC), a first relationship between a temperature and heating power of the region of the IC is determined. Based on a cooling capacity of the region of the IC, a second relationship between the temperature and cooling power of the region of the IC is determined. Based on the first relationship and the second relationship, it is determined whether the region of the IC is thermally stable. In response to a determination that the region of the IC is thermally unstable, at least one of a structure or the operating condition of the region of the IC is changed. At least one of the determination of the first relationship, the determination of the second relationship, the determination of thermally stability of the region, or the change of at least one of the structure or the operating condition of the region is executed by a processor.

In some embodiments, a system comprises a processor. The processor is configured to determine a heating power characteristic of a region of an integrated circuit (IC), by repeatedly performing, at each iteration among a plurality of iterations, operations including calculating leakage power and heating power of the region at a temperature value, calculating a temperature increment corresponding to the calculated leakage power, and based on the calculated temperature increment, updating the temperature value for a next iteration among the plurality of iterations. The processor is further configured to, based on a cooling capacity of the region, determine a cooling power characteristic of the region. The processor is further configured to, in response to the heating and cooling power characteristics having at least one common point, determine that the region is thermally stable. The processor is further configured to, in response to the heating and cooling power characteristics having no common point, determine that the region is thermally unstable, and change at least one of a structure or an operating condition of the region.

In some embodiments, a computer program product comprises a non-transitory, computer-readable medium containing instructions therein. The instructions, when executed by a processor, cause the processor to determine a heating power characteristic of a standard cell to be included in an integrated circuit (IC), by repeatedly performing, at each iteration among a plurality of iterations, operations including calculating leakage power and heating power of the standard cell at a temperature value, calculating a temperature increment corresponding to the calculated leakage power, and based on the calculated temperature increment, updating the temperature value for a next iteration among the plurality of iterations. The instructions further cause the processor to, based on a thermal resistance of the standard cell, determine a cooling power characteristic of the standard cell. The instructions further cause the processor to, in response to the heating and cooling power characteristics having at least one common point, determine that the standard cell is thermally stable. The instructions further cause the processor to, in response to the heating and cooling power characteristics having no common point, determine that the standard cell is thermally unstable, and change at least one of a structure or an operating condition of the standard cell. The instructions, when executed by the processor, cause the processor to calculate the temperature increment of the standard cell, using Equation (8).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   based on an operating condition of a region of an integrated circuit (IC), determining a first relationship between a temperature and heating power of the region of the IC;
   based on a cooling capacity of the region of the IC, determining a second relationship between the temperature and cooling power of the region of the IC;
   based on the first relationship and the second relationship, determining whether the region of the IC is thermally stable; and
   in response to a determination that the region of the IC is thermally unstable, changing at least one of a structure or the operating condition of the region of the IC,
   wherein at least one of the determining the first relationship, the determining the second relationship, the determining whether the region of the IC is thermally stable, or the changing is executed by a processor.

2. The method of claim 1, wherein
   the changing comprises changing the structure of the region of the IC by at least one of
   altering placement of at least one cell in the region of the IC,
   adding dummy patterns in or around the region of the IC, or
   replacing at least one cell in the region of the IC with another cell having a same function but with lower heating power.

3. The method of claim 1, wherein
   the changing comprises changing the operating condition of the region of the IC by lowering at least one of operating voltage, operating frequency, or loading of the region of the IC.

4. The method of claim 1, wherein
   the region of the IC comprises at least one standard cell retrieved from a cell library.

5. The method of claim 1, wherein the determining whether the region of the IC is thermally stable comprises:
   in response to the first and second relationships having at least one common point where the heating power and the cooling power have a same power value at a same temperature value,
   determining that the region of the IC is thermally stable, and
   in response to the first and second relationships having no common point, determining that the region of the IC is thermally unstable.

6. The method of claim 1, further comprising:
in response to the first and second relationships having one or more common points, at each of which the heating power and the cooling power have a same power value at a same temperature value, the one or more common points corresponding to one or more power values,
outputting an indication that a lowest power value among the one or more power values is a maximum allowable power value of the region of the IC.

7. The method of claim 6, wherein
the region is one of a plurality of regions of the IC, and
the method further comprises outputting a target total power of the IC, the target total power corresponding to a sum of maximum allowable power values of the plurality of regions of the IC.

8. The method of claim 1, further comprising:
in response to the first and second relationships having only one common point where the heating power and the cooling power have a same power value at a same temperature value,
outputting an indication to add an external cooling device to the IC in use.

9. The method of claim 1, wherein
the determining the first relationship comprises repeatedly performing, at each iteration among a plurality of iterations, operations including
calculating leakage power and the heating power of the region at a temperature value,
calculating a temperature increment corresponding to the calculated leakage power, and
based on the calculated temperature increment, updating the temperature value for a next iteration among the plurality of iterations.

10. The method of claim 9, wherein
at each iteration among the plurality of iterations,
the calculating the heating power of the region comprises using the following equation $$P_{Heating} = P_{Switching} + P_{Internal} + P_{Leakage}$$

where $P_{Leakage}$ is the leakage power of the region,
$P_{Heating}$ is the heating power of the region,
$P_{Switching}$ is switching power of the region, and
$P_{Internal}$ is internal power of the region.

11. The method of claim 10, wherein
at each iteration among the plurality of iterations,
the calculating the temperature increment comprises using the following equation $$\Delta T = \ln \frac{VDD \times I_{s0}}{P_{leakage}}$$

where $\Delta T$ is the temperature increment corresponding to $P_{Leakage}$,
VDD is an operating voltage defined in the operating condition of the region, and
$I_{s0}$ is a leakage current defined by the structure of the region.

12. A system, comprising a processor configured to
determine a heating power characteristic of a region of an integrated circuit (IC), by repeatedly performing, at each iteration among a plurality of iterations, operations including
calculating leakage power and heating power of the region at a temperature value,
calculating a temperature increment corresponding to the calculated leakage power, and
based on the calculated temperature increment, updating the temperature value for a next iteration among the plurality of iterations,
based on a cooling capacity of the region, determine a cooling power characteristic of the region,
in response to the heating and cooling power characteristics intersecting or touching each other,
determine that the region is thermally stable, and
in response to the heating and cooling power characteristics neither intersecting nor touching each other,
determine that the region is thermally unstable, and
change at least one of a structure or an operating condition of the region.

13. The system of claim 12, wherein the processor is configured to
at each iteration among the plurality of iterations,
calculate the heating power of the region, using the following equation $$P_{Heating} = P_{Switching} + P_{Internal} + P_{Leakage}$$

where $P_{Leakage}$ is the leakage power of the region,
$P_{Heating}$ is the heating power of the region,
$P_{Switching}$ is switching power of the region, and
$P_{Internal}$ is internal power of the region.

14. The system of claim 13, wherein the processor is configured to
at each iteration among the plurality of iterations,
calculate the temperature increment, using the following equation $$\Delta T = \ln \frac{VDD \times I_{s0}}{P_{leakage}}$$

where $\Delta T$ is the temperature increment corresponding to $P_{Leakage}$,
VDD is an operating voltage defined in the operating condition of the region, and
$I_{s0}$ is a leakage current defined by the structure of the region.

15. The system of claim 12, wherein the processor is configured to
in response to the heating and cooling power characteristics intersecting or touching each other at one point,
output an indication to add an external cooling device to the IC in use.

16. The system of claim 12, wherein the processor is configured to
in response to the heating and cooling power characteristics intersecting or touching each other at multiple points corresponding to different power values,
output an indication that a lowest power value among the different power values is a maximum allowable power value of the region of the IC.

17. The system of claim 12, wherein the processor is configured to
in response to the heating and cooling power characteristics neither intersecting nor touching each other,
change the structure of the region of the IC by at least one of
altering placement of at least one cell in the region of the IC, adding dummy patterns in or around the region of the IC, or replacing at least one cell in the region of the IC with another cell having a same function but with lower heating power.

18. The system of claim 12, wherein the processor is configured to in response to the heating and cooling power characteristics neither intersecting nor touching each other, change the operating condition of the region of the IC by lowering at least one of operating voltage, operating frequency, or loading of the region of the IC.

19. A computer program product, comprising a non-transitory, computer-readable medium containing instructions therein which, when executed by a processor, cause the processor to determine a heating power characteristic of a standard cell to be included in an integrated circuit (IC), by repeatedly performing, at each iteration among a plurality of iterations, operations including calculating leakage power and heating power of the standard cell at a temperature value, calculating a temperature increment corresponding to the calculated leakage power, and based on the calculated temperature increment, updating the temperature value for a next iteration among the plurality of iterations, based on a thermal resistance of the standard cell, determine a cooling power characteristic of the standard cell, in response to the heating and cooling power characteristics intersecting or touching each other, determine that the standard cell is thermally stable, and in response to the heating and cooling power characteristics neither intersecting nor touching each other, determine that the standard cell is thermally unstable, and change at least one of a structure or an operating condition of the standard cell, wherein the instructions, when executed by the processor, cause the processor to calculate the temperature increment of the standard cell, using the following equation $$\Delta T = \ln \frac{VDD \times I_{s0}}{P_{leakage}}$$

where $P_{Leakage}$ is the leakage power, $\Delta T$ is the temperature increment corresponding to $P_{Leakage}$, VDD is an operating voltage defined in the operating condition of the standard cell, and $I_{s^0}$ is a leakage current defined by the structure of the standard cell.

20. The computer program product of claim 19, wherein the instructions, when executed by the processor, further cause the processor to calculate the heating power of the standard cell, using the following equation $$P_{Heating} = P_{Switching} + P_{Internal} + P_{Leakage}$$

where $P_{Heating}$ is the heating power of the standard cell, $P_{Switching}$ is switching power of the standard cell, and $P_{Internal}$ is internal power of the standard cell.

* * * * *